(12) United States Patent
Koyama (10) Patent No.: US 12,308,480 B2
(45) Date of Patent: May 20, 2025

(54) ALL-SOLID-STATE BATTERY

(71) Applicant: SAMSUNG ELECTRO-MECHANICS CO., LTD., Suwon-si (KR)

(72) Inventor: Masaki Koyama, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 906 days.

(21) Appl. No.: 17/486,158

(22) Filed: Sep. 27, 2021

(65) Prior Publication Data
US 2022/0209378 A1   Jun. 30, 2022

(30) Foreign Application Priority Data
Dec. 31, 2020   (KR) .................. 10-2020-0189534

(51) Int. Cl.
*H01M 50/586* (2021.01)
*H01M 4/36* (2006.01)
*H01M 4/62* (2006.01)
*H01M 10/0525* (2010.01)
*H01M 10/0585* (2010.01)
*H01M 4/02* (2006.01)

(52) U.S. Cl.
CPC ......... *H01M 50/586* (2021.01); *H01M 4/366* (2013.01); *H01M 4/628* (2013.01); *H01M 10/0525* (2013.01); *H01M 10/0585* (2013.01); *H01M 2004/027* (2013.01)

(58) Field of Classification Search
None
See application file for complete search history.

(56) References Cited

U.S. PATENT DOCUMENTS

2020/0020974 A1   1/2020   Shimizu et al.
2021/0249697 A1*  8/2021   Yoshioka .............. H01M 4/139

FOREIGN PATENT DOCUMENTS

| JP | 2006-261008 A | 9/2006 |
| JP | 2011-198692 A | 10/2011 |
| JP | 2020-126791 A | 8/2020 |
| WO | 2018/203474 A1 | 11/2018 |

* cited by examiner

*Primary Examiner* — Lucas J. O'Donnell
(74) *Attorney, Agent, or Firm* — Morgan Lewis & Bockius LLP (57) ABSTRACT

An all-solid-state battery includes an electrode assembly in which a solid electrolyte layer, a positive electrode layer, and a negative electrode layer are alternately stacked; a negative electrode terminal connected to the negative electrode layer; a positive electrode terminal connected to the positive electrode layer; and an insulator disposed to contact an end portion of the negative electrode layer in the first direction, and at least one of a negative electrode ion concentration portion and a negative electrode electric field concentration portion is disposed to be spaced apart from a negative electrode longitudinal end portion disposed on the same negative electrode reference surface.

23 Claims, 7 Drawing Sheets

PRIOR ART

FIG. 11

ALL-SOLID-STATE BATTERY

CROSS-REFERENCE TO RELATED APPLICATION(S)

This application claims benefit of priority to Korean Patent Application No. 10-2020-0189534 filed on Dec. 31, 2020 in the Korean Intellectual Property Office, the disclosure of which is incorporated herein by reference in its entirety.

TECHNICAL FIELD

The present disclosure relates to an all-solid-state battery.

BACKGROUND

Recently, devices using electricity as an energy source are increasing. With the expansion of applications of devices using electricity as an energy source, such as smartphones, camcorders, notebook PCs, electric vehicles, or the like, interest in electric storage devices using electrochemical elements is increasing. Among various electrochemical elements, lithium secondary batteries that may be charged and discharged, have a high operating voltage, and have a large energy density, have been in the spotlight.

A lithium secondary battery may be manufactured by applying a material capable of intercalating and de-intercalating lithium ions into a positive electrode and a negative electrode, and injecting a liquid electrolyte between the positive electrode and the negative electrode, and electricity may be generated or consumed by the reduction or oxidation reaction of the lithium secondary battery intercalating and de-intercalating the lithium ions in the negative electrode and the positive electrode. Such a lithium secondary battery should basically be stable in the operating voltage range of the battery, and should have performance capable of transferring ions at a sufficiently high rate.

When a liquid electrolyte, such as a nonaqueous electrolyte, is used in the lithium secondary battery, the discharge capacity and the energy density may be advantageously high. However, since high voltage lithium secondary batteries are difficult to implement, there may be problems such as relatively high risk of electrolyte leakage, fires, and explosions.

In order to solve the above problems, a secondary battery using a solid electrolyte, instead of a liquid electrolyte, has been proposed as an alternative. The solid electrolyte may be classified as a polymer-based solid electrolyte and a ceramic-based solid electrolyte, among which the ceramic-based solid electrolyte has an advantage of exhibiting high stability. However, in the case of the ceramic-based solid electrolyte, there may be a problem that ion conductivity is lowered or charge/discharge efficiency is lowered due to poor interface contact between an electrolyte and an electrode, an interfacial side reaction, or the like. In addition, there are problems that dendrites may grow due to ion concentration in an end portion of an electrode assembly, or dielectric breakdown may occur due to concentration of an electric field in the end portion.

SUMMARY

An aspect of the present disclosure is to suppress ion concentration in a negative electrode and/or a positive electrode of an all-solid-state battery.

Another aspect of the present disclosure is to suppress electric field concentration in a negative electrode and/or a positive electrode of an all-solid-state battery.

Another aspect of the present disclosure is to provide an all-solid-state battery capable of suppressing dendrite growth.

According to an aspect of the present disclosure, an all-solid-state battery includes an electrode assembly including first and second surfaces opposed in a first direction, third and fourth surfaces opposed in a second direction, and fifth and sixth surfaces opposed in a third direction, and in which a solid electrolyte layer, a positive electrode layer, and a negative electrode layer are alternately stacked in the third direction; a negative electrode terminal connected to the negative electrode layer; a positive electrode terminal connected to the positive electrode layer; and an insulator disposed to contact an end portion of the negative electrode layer in the first direction. The negative electrode layer comprises a negative electrode current collector, a negative electrode active material, and a negative electrode protrusion from which the negative electrode active material extends to protrude toward the insulator, and at least one of a negative electrode ion concentration portion and a negative electrode electric field concentration portion is disposed to be spaced apart from a negative electrode longitudinal end portion disposed on the same negative electrode reference surface, where, the negative electrode reference surface refers to a virtual first direction-second direction plane contacting the negative electrode active material in the third direction, the negative electrode ion concentration portion refers to an end of the insulator in a direction facing the negative electrode layer, the negative electrode electric field concentration portion refers to a region in which a virtual line in the third direction and the negative electrode reference surface are in contact with each other, wherein the virtual line is drawn to contact an end of the negative electrode current collector in a direction facing the positive electrode terminal, and the negative electrode longitudinal end portion refers to a region in which a virtual line in the third direction and the negative electrode reference surface are in contact with each other, wherein the virtual line is drawn to contact an end of the negative electrode protrusion in a direction facing the positive electrode terminal.

According to another aspect of the present disclosure, an all-solid-state battery includes an electrode assembly including first and second surfaces opposed in a first direction, third and fourth surfaces opposed in a second direction, and fifth and sixth surfaces opposed in a third direction, and in which a solid electrolyte layer, a positive electrode layer, and a negative electrode layer are alternately stacked in the third direction; a negative electrode terminal connected to the negative electrode layer; and a positive electrode terminal connected to the positive electrode layer. The negative electrode layer comprises a negative electrode current collector, a negative electrode active material, and a negative electrode protrusion from which the negative electrode active material extends to protrude toward the positive electrode terminal, an end portion of the negative electrode protrusion in a direction facing the positive electrode terminal has a rounded shape, and at least one of a negative electrode ion concentration portion and a negative electrode electric field concentration portion is disposed to be spaced apart from a negative electrode longitudinal end portion disposed on the same negative electrode reference surface, where, the negative electrode reference surface refers to a virtual first direction-second direction plane contacting the negative electrode active material in the third direction, the negative electrode ion concentration portion refers to a point of the negative electrode protrusion of which the rounded shape starts, the negative electrode electric field concentration portion refers to a region in which a virtual line in the third direction and the negative electrode reference surface are in contact with each other, wherein the virtual line is drawn to contact an end of the negative electrode current collector in a direction facing the positive electrode terminal, and the negative electrode longitudinal end portion refers to a region in which a virtual line in the third direction and the negative electrode reference surface are in contact with each other, wherein the virtual line is drawn to contact an end of the negative electrode protrusion in a direction facing the positive electrode terminal.

According to another aspect of the present disclosure, an all-solid-state battery includes an electrode assembly including first and second surfaces opposed in a first direction, third and fourth surfaces opposed in a second direction, and fifth and sixth surfaces opposed in a third direction, and in which a solid electrolyte layer, a negative electrode layer, and a positive electrode layer are alternately stacked in the third direction; a positive electrode terminal connected to the positive electrode layer; a negative electrode terminal connected to the negative electrode layer; and an insulator disposed to contact an end portion of the positive electrode layer in the first direction. The positive electrode layer comprises a positive electrode current collector, a positive electrode active material, and a positive electrode protrusion from which the positive electrode active material extends to protrude toward the insulator, and at least one of a positive electrode ion concentration portion and a positive electrode electric field concentration portion is disposed to be spaced apart from a positive electrode longitudinal end portion disposed on the same positive electrode reference surface, where, the positive electrode reference surface refers to a virtual first direction-second direction plane contacting the positive electrode active material in the third direction, the positive electrode ion concentration portion refers to an end of the insulator in a direction facing the negative electrode layer, the positive electrode electric field concentration portion refers to a region in which a virtual line in the third direction and the positive electrode reference surface are in contact with each other, wherein the virtual line is drawn to contact an end of the positive electrode current collector in a direction facing the insulator, and the positive electrode longitudinal end portion refers to a region in which a virtual line in the third direction and the positive electrode reference surface are in contact with each other, wherein the virtual line is drawn to contact an end of the positive electrode protrusion in a direction facing the negative electrode terminal.

According to another aspect of the present disclosure, an all-solid-state battery includes an electrode assembly including first and second surfaces opposed in a first direction, third and fourth surfaces opposed in a second direction, and fifth and sixth surfaces opposed in a third direction, and in which a solid electrolyte layer, a negative electrode layer, and a positive electrode layer are alternately stacked in the third direction; a positive electrode terminal connected to the positive electrode layer; and a negative electrode terminal connected to the negative electrode layer. The positive electrode layer comprises a positive electrode current collector, a positive electrode active material, and a positive electrode protrusion from which the positive electrode active material extends to protrude toward the negative electrode terminal, an end portion of the positive electrode protrusion in a direction facing the negative electrode terminal has a rounded shape, and at least one of a positive electrode ion concentration portion and a positive electrode electric field concentration portion is disposed to be spaced apart from a positive electrode longitudinal end portion disposed on the same positive electrode reference surface, where, the positive electrode reference surface refers to a virtual first direction-second direction plane contacting the positive electrode active material in the third direction, the positive electrode ion concentration portion refers to a point of the positive electrode protrusion at which the rounded shape starts, the positive electrode electric field concentration portion refers to a region in which a virtual line in the third direction and the positive electrode reference surface are in contact with each other, wherein the virtual line is drawn to contact an end of the positive electrode current collector in a direction facing the negative electrode terminal, and the positive electrode longitudinal end portion refers to a region in which a virtual line in the third direction and the positive electrode reference surface are in contact with each other, wherein the virtual line is drawn to contact an end of the positive electrode protrusion in a direction facing the negative electrode terminal.

According to another aspect of the present disclosure, an all-solid-state battery includes an electrode assembly including a solid electrolyte layer, a positive electrode layer, and a negative electrode layer alternately stacked; a negative electrode terminal connected to the negative electrode layer; and a positive electrode terminal connected to the positive electrode layer. One of the positive electrode layer and the negative electrode layer comprises an electrode active material and an electrode current collector embedded in the electrode active material, an insulator disposed between the electrode active material and one of the negative electrode terminal and the positive electrode terminal, and the electrode current collector is spaced apart from the insulator.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings. The present disclosure may, however, be exemplified in many different forms and should not be construed as being limited to the specific embodiments set forth herein.

Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and thicknesses are enlarged in order to clearly represent layers and regions, and similar portions having the same functions within the same scope are denoted by similar reference numerals throughout the specification.

In the present specification, expressions such as "have," "may have," "include," "comprise," "may include," or "may comprise" may refer to the presence of corresponding features (e.g., elements such as numbers, functions, actions, or components), and does not exclude the presence of additional features.

In the present specification, expressions such as "A and/or B," "at least one of A and B," or "one or more of A and B" may include all possible combinations of items listed together. For example, "A and/or B," "at least one of A and B," or "one or more of A and B" may refer to (1) including at least one A, (2) including at least one B, or (3) including all at least one A and at least one B.

In the drawings, an X direction may be defined as a first direction, an L direction, or a length direction, a Y direction may be defined as a second direction, a W direction, or a width direction, and a Z direction may be defined as a third direction, a T direction, or a thickness direction.

The present disclosure relates to an all-solid-state battery 100. FIGS. 1 to 7 may be views schematically illustrating an all-solid-state battery 100 according to an embodiment of the present disclosure. Referring to FIGS. 1 to 7, an all-solid-state battery 100 according to the present disclosure may include an electrode assembly 110 including first and second surfaces S1 and S2 opposed in a first direction (an X direction), third and fourth surfaces S3 and S4 opposed in a second direction (a Y direction), and fifth and sixth surfaces S5 and S6 opposed in a third direction (a Z direction), and in which a solid electrolyte layer 111, a positive electrode layer 121, and a negative electrode layer 122 are alternately stacked in the third direction; a negative electrode terminal 132 connected to the negative electrode layer 122; a positive electrode terminal 131 connected to the positive electrode layer 121; and an insulator 141 disposed to contact an end portion of the negative electrode layer 122 in the first direction (the X direction).

In this case, the negative electrode layer 122 may include a negative electrode current collector 122a, a negative electrode active material 122b, and a negative electrode protrusion 122c from which the negative electrode active material 122b extends to protrude toward the insulator 141. In addition, at least one of a negative electrode ion concentration portion I and a negative electrode electric field concentration portion E may be disposed to be spaced apart from a negative electrode longitudinal end portion T disposed on the same negative electrode reference surface. The negative electrode reference surface refers to a virtual X-Y plane contacting the negative electrode active material 122b in the third direction (the Z direction). The negative electrode ion concentration portion I refers to an end of the insulator 141 in a direction facing the negative electrode layer 122. The negative electrode electric field concentration portion E refers to a region in which a virtual line in the third direction and the negative electrode reference surface are in contact with each other, wherein the virtual line is drawn to contact an end of the negative electrode current collector in a direction facing the positive electrode terminal. The negative electrode longitudinal end portion T refers to a region in which a virtual line in the third direction (the Z direction) and the negative electrode reference surface are in contact with each other, wherein the virtual line is drawn to contact an end of the negative electrode protrusion 122c in a direction facing the positive electrode terminal 131.

Figure 11:
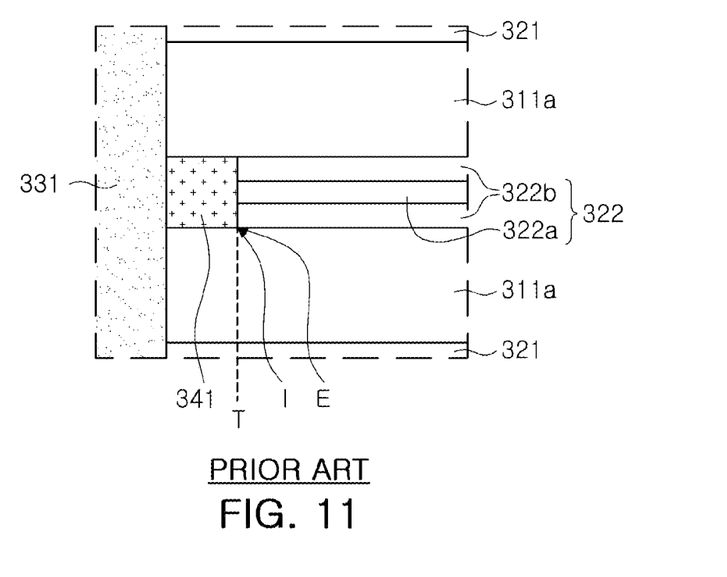
FIG. 11 is an enlarged view of a cross-section of an electrode according to a prior art of the present disclosure.

FIG. 11 may be a view schematically illustrating an electrode structure of a conventional all-solid-state battery. Referring to FIG. 11, it can be seen that a negative electrode electric field concentration portion E is formed in a position corresponding to an end portion of a negative electrode current collector 322a of a negative electrode layer 322 in a direction facing a positive electrode terminal 331, a negative electrode ion concentration portion I is formed in an end portion of a negative electrode active material 322b, and the negative electrode electric field concentration portion E and the negative electrode ion concentration portion I have a position in which all of them overlap a negative electrode longitudinal end portion T. In this case, dendrite may be formed in a position in which the negative electrode electric field concentration portion E, the negative electrode ion concentration portion I, and the negative electrode longitudinal end portion T overlap.

In conventional all-solid-state batteries, dendrite may be less likely to occur than a battery using a liquid electrolyte, but an ion concentration portion and/or an electric field concentration portion may be formed in a position such as an end portion of an active material and/or an end portion of a current collector. In this case, since charging and discharging may be performed only in a relatively narrow range, there may be a problem in that dendrites may be generated. An all-solid-state battery according to the present disclosure may have a structure in which at least one of a negative electrode ion concentration portion I and a negative electrode electric field concentration portion E are disposed to be spaced apart from a negative electrode longitudinal end portion T disposed on the same negative electrode reference surface to suppress ion concentration and/or electric field concentration, to prevent dendrite generation.

In another embodiment of the present disclosure, an all-solid-state battery according to the present disclosure may include an electrode assembly including first and second surfaces S1 and S2 opposed in a first direction (an X direction), third and fourth surfaces S3 and S4 opposed in a second direction (a Y direction), and fifth and sixth surfaces S5 and S6 opposed in a third direction (a Z direction), and in which a solid electrolyte layer, a positive electrode layer 121, and a negative electrode layer 122 are alternately stacked in the third direction (the Z direction); a negative electrode terminal connected to the negative electrode layer 122; and a positive electrode terminal connected to the positive electrode layer 121.

Figure 8:
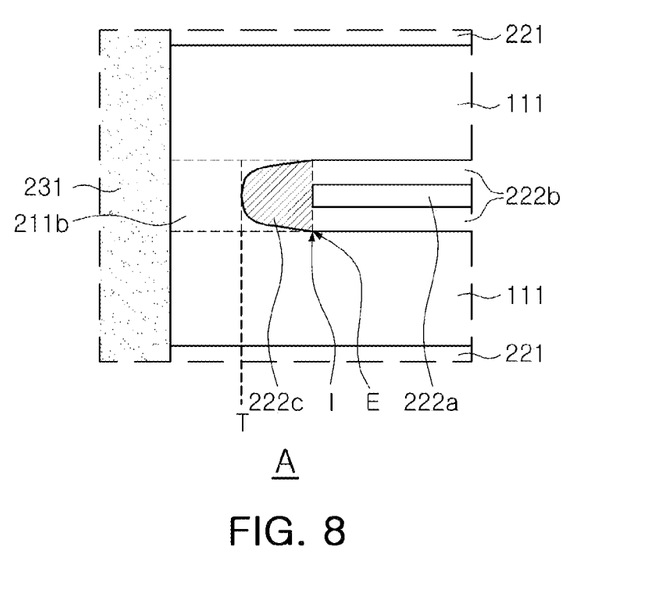
FIGS. 8 to 10 are enlarged views of portion A of FIG. 3, and are views illustrating various examples of an all-solid-state battery according to another embodiment of the present disclosure.
Figure 9:
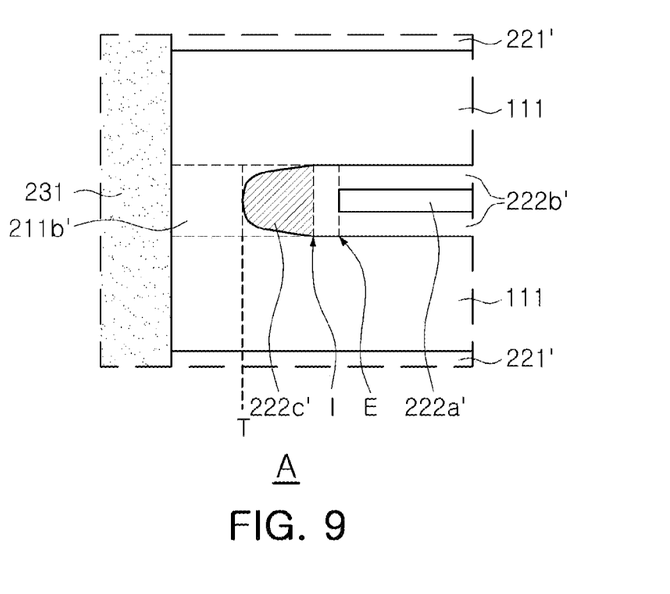
Figure 10:
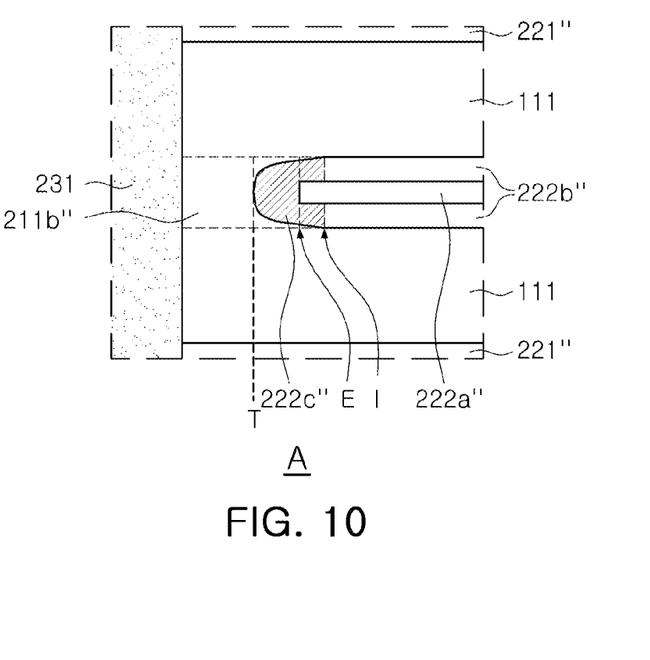

FIGS. 8 to 10 may be views schematically illustrating a region of a negative electrode layer 222 of an all-solid-state battery according to the present embodiment. Regions other than the negative electrode layer 222 may be the same as in the above-described embodiment, and thus will be omitted.

Referring to FIGS. 8 to 10, the negative electrode layer 222 may include a negative electrode current collector 222a, a negative electrode active material 222b, and a negative electrode protrusion 222c from which the negative electrode active material 222b extends to protrude toward a positive electrode terminal 231, and an end portion of the negative electrode protrusion 222c in a direction facing the positive electrode terminal 231 may have a rounded shape. In this case, at least one of a negative electrode ion concentration portion I and a negative electrode electric field concentration portion E may be disposed to be spaced apart from a negative electrode longitudinal end portion T disposed on the same negative electrode reference surface. The negative electrode reference surface refers to a virtual X-Y plane contacting the negative electrode active material 222b in the third direction (the Z direction). The negative electrode ion concentration portion I refers to a point of the negative electrode protrusion 222c of which the rounded shape starts. The negative electrode electric field concentration portion E refers to a region in which a virtual line in the third direction and the negative electrode reference surface are in contact with each other, wherein the virtual line is drawn to contact an end of the negative electrode current collector in a direction facing the positive electrode terminal. The negative electrode longitudinal end portion T refers to a region in which a virtual line in the third direction (the Z direction) and the negative electrode reference surface are in contact with each other, wherein the virtual line is drawn to contact an end of the negative electrode protrusion 222c in a direction facing the positive electrode terminal 231. The insulator 141 implemented in the embodiments shown in FIGS. 4-7 may be replaced with a material of the solid electrolyte layer, denoted by 211b, 211b', or 211b" in FIGS. 8-10.

An electrode assembly 110 of an all-solid-state battery according to the present disclosure may include a solid electrolyte layer 111, a negative electrode layer 122, a positive electrode layer 121, and an insulator 141.

In an embodiment of the present disclosure, the solid electrolyte layer 111 according to the present disclosure may be one or more selected from the group consisting of a garnet-type solid electrolyte layer, a sodium super ionic conductor (NASICON)-type solid electrolyte layer, a lithium super ionic conductor (LISICON)-type solid electrolyte layer, a perovskite-type solid electrolyte layer, and a lithium phosphorus oxynitride (LiPON)-type solid electrolyte layer.

The garnet-type solid electrolyte layer may refer to a layer including lithium-lanthanum zirconium oxide (LLZO) represented by $Li_aLa_bZr_cO_{12}$ such as $Li_7La_3Zr_2O_{12}$, or the like, and the NASICON-type solid electrolyte layer may refer to a layer including lithium-aluminum-titanium-phosphate (LATP) represented by $Li_{1+x}Al_xTi_{2-x}(PO_4)_3$ (0<x<1) in which Ti has been introduced into $Li_{1+x}Al_xM_{2-x}(PO_4)_3$ (LAMP) type compound (where 0<x<2, M=Zr, Ti, or Ge), lithium-aluminum-germanium-phosphate (LAGP) represented by $Li_{1-x}Al_xGe_{2-x}(PO_4)_3$ (0<x<1) such as $Li_{1.3}Al_{0.3}Ti_{1.7}(PO_4)_3$ into which excess lithium has been introduced; and/or lithium-zirconium-phosphate (LZP) represented by $LiZr_2(PO_4)_3$.

In addition, the LISICON-type solid electrolyte layer may refer to a layer including solid solution oxides including $Li_4Zn(GeO_4)_4$, $Li_{10}GeP_2O_{12}$ (LGPO), $Li_{3.5}Si_{0.5}P_{0.5}O_4$, $Li_{10.42}Si(Ge)_{1.5}P_{1.5}Cl_{0.08}O_{11.92}$, or the like, represented by $xLi_3AO_4$-(1-x)$Li_4BO_4$ (where A=P, As, V, or the like, and B=Si, Ge, Ti, or the like), and solid solution sulfides including $Li_2S-P_2S_5$, $Li_2S-SiS_2$, $Li_2S-SiS_2-P_2S_5$, $Li_2S-GeS_2$, or the like, represented by $Li_{4-x}M_{1-y}M'_yS_4$ (where M=Si or Ge, and M'=P, Al, Zn, or Ga).

The perovskite-type solid electrolyte layer may refer to a layer including lithium-lanthanum-titanate (LLTO) represented by $Li_{3x}La_{2/3-x}\square_{1/3-2x}TiO_3$ (0<x<0.16, $\square$=vacancies) such as $Li_{1/8}La_{5/8}TiO_3$, or the like, and the LiPON-type solid electrolyte layer may refer to a layer including a nitride such as lithium-phosphorous-oxynitride such as $Li_{2.8}PO_{3.3}N_{0.46}$, or the like.

The negative electrode layer 122 of the all-solid-state battery according to the present disclosure may be stacked such that its cross-sections are respectively exposed from both end portions of the electrode assembly 110, opposed in the first direction (the X direction). Specifically, the negative electrode layer 122 may be exposed in a direction facing a first surface S1 of the electrode assembly 110. In addition, the insulator 141 may be disposed to be exposed in a direction facing a second surface S2, opposite to the direction facing the first surface S1, from which the negative electrode layer 122 is exposed.

Referring to FIGS. 1 to 7, the insulator 141 may be disposed to oppose the negative electrode layer 122 in the first direction (the X direction), and may be disposed on the same X-Y plane as the negative electrode layer 122. In the present specification, a state in which a member is "disposed on the same surface" does not refer to only the same plane in a strict sense, but may include margins of errors to cover ranges to which a position of the member is similar. The margins of errors may have, for example, a difference in angle within a range of ±10° or a difference in position of less than 10 μm, based on the above-defined surface. In the all-solid-state battery 100 according to the present disclosure, the insulator 141 may be disposed on the same plane as the negative electrode layer 122, to prevent structural defects due to a step difference of the electrode assembly 110 in the first direction (the X direction).

The insulator 141 may include a ceramic material, for example, alumina ($Al_2O_3$), aluminum nitride (AlN), beryllium oxide (BeO), boron nitride (BN), silicon (Si), silicon carbide (SiC), silica ($SiO_2$), silicon nitride ($Si_3N_4$), gallium arsenide (GaAs), gallium nitride (GaN), barium titanate ($BaTiO_3$), zirconium dioxide ($ZrO_2$), mixtures thereof, oxides and/or nitrides of these materials, or any other suitable ceramic materials, but is not limited thereto. In addition, the insulator 141 may selectively include the above-described solid electrolyte, and may include one or more solid electrolytes, but is not limited thereto.

A negative electrode 122 of an all-solid-state battery 100 according to the present disclosure may include a negative electrode current collector 122a and a negative electrode active material 122b.

A negative electrode layer 122 included in an all-solid-state battery 110 according to the present disclosure may include a component known to be usable as a negative electrode active material. As the negative electrode active material 122b, a carbon-based material, silicon, silicon oxide, a silicon-based alloy, a silicon-carbon-based material composite, tin, a tin-based alloy, a tin-carbon composite, a metal oxide, or a combination thereof may be used, and a lithium metal and/or a lithium metal alloy may be included.

The lithium metal alloy may include lithium, and a metal/metalloid alloyable with lithium. Examples of the metal/metalloid alloyable with lithium may be Si, Sn, Al, Ge, Pb, Bi, Sb, a Si—Y alloy (where Y is an alkaline metal, an alkaline earth metal, Group 13 to Group 16 elements, a transition metal, or a rare earth element, except for Si), a Sn—Y alloy (where Y is an alkaline metal, an alkaline earth metal, Group 13 to Group 16 elements, a transition metal such as a lithium titanium oxide ($Li_4Ti_5O_{12}$), or the like, or a rare earth element, except for Sn), $MnO_x$ (0<x≤2), or the like. Examples of Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In addition, an oxide of the metal/metalloid alloyable with lithium may be lithium titanium oxide, vanadium oxide, lithium vanadium oxide, $SnO_2$, $SiO_x$ (0<x<2), or the like. For example, the negative electrode active material may include one or more elements selected from the group consisting of Group 13 to Group 16 elements of the Periodic Table of Elements. For example, the negative electrode active material may include one or more elements selected from the group consisting of Si, Ge, and Sn.

The carbon-based material may be crystalline carbon, amorphous carbon, or a mixture thereof. The crystalline carbon may be graphite such as amorphous, plate-like, flake, spherical, or fibrous natural graphite or artificial graphite. In addition, the amorphous carbon may be soft carbon (low temperature calcined carbon), hard carbon, mesophase pitch carbide, calcined coke, graphene, carbon black, fullerene soot, carbon nanotubes, carbon fibers, and the like, but is not limited thereto.

The silicon may be selected from the group consisting of Si, $SiO_x$ (0<x<2, for example 0.5 to 1.5), or a silicon-containing metal alloy, and mixtures thereof. The silicon-containing metal alloy may include, for example, silicon, and one or more of Al, Sn, Ag, Fe, Bi, Mg, Zn, in, Ge, Pb, and Ti.

As the negative electrode current collector 122a, a porous body such as a mesh, mesh-like, or the like may be used, and a porous metal plate such as stainless steel, nickel, copper, aluminum, or the like may be used, but is not limited thereto. In addition, the negative electrode current collector may be coated with an oxidation resistant metal or alloy film to prevent oxidation.

A negative electrode active material 122b of an all-solid-state battery 100 according to the present disclosure may optionally contain a conductive agent and a binder. The conductive agent is not particularly limited as long as it has conductivity without causing a chemical change in the all-solid-state battery of the present disclosure. For example, graphite such as natural graphite, artificial graphite, or the like; carbon-based materials, such as carbon black, acetylene black, Ketjen black, channel black, furnace black, lamp black, summer black, or the like; conductive fibers, such as carbon fibers, metal fibers, or the like; carbon fluoride; a metal powder, such as aluminum, nickel powder, or the like; conductive whiskers, such as zinc oxide, potassium titanate, or the like; a conductive metal oxide, such as a titanium oxide, or the like; and a conductive material, such as a polyphenylene derivative, or the like, may be used.

The binder may be used to improve bonding strength between the active material and the conductive agent, or the like. The binder may be polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, various copolymers, or the like, but is not limited thereto.

A negative electrode layer 122 applied to an all-solid-state battery of the present disclosure may be produced by directly coating and drying a composition containing a negative electrode active material on a negative electrode current collector containing a metal such as copper, or the like, but is not limited thereto.

In an example of the present disclosure, a negative electrode layer 122 may include a negative electrode protrusion 122c. FIGS. 4 to 7 may be views schematically illustrating a negative electrode protrusion 122c of an all-solid-state battery according to the present disclosure. Referring to FIGS. 4 to 7, a negative electrode protrusion 122c (122c' or 122c") of the present disclosure may be a portion in which a negative electrode active material extends, and may be disposed to protrude in the first direction. The negative electrode protrusion 122c (122c' or 122c") may be disposed such that the negative electrode active material protrudes toward an insulator, and may be disposed to protrude toward a positive electrode terminal. The negative electrode protrusion 122c (122c' or 122c") may function to prevent concentration of ions in a certain portion of the negative electrode active material and increase an area for charging/discharging.

In an example of the present disclosure, one end portion of the negative electrode protrusion 122c of the all-solid-state battery may have a tetragonal shape. When the negative electrode protrusion 122c of the all-solid-state battery has a tetragonal shape, it may refer that the negative electrode protrusion 122c observed in the XZ cross-section passing through a center of the all-solid-state battery has a tetragonal shape, and it may refer that, more specifically, a shape of the negative electrode protrusion 122c in a direction facing the positive electrode terminal has a tetragonal shape. The tetragonal shape may not refer to only a square/rectangular shape. As long as it may be recognized as a tetragonal shape, various modifications such as an inclined shape or the like are possible.

In another example of the present disclosure, one end portion of the negative electrode protrusion 122c (for example, 122c' in FIG. 5 or 122c" in FIGS. 6 and 7) of the all-solid-state battery may have a rounded shape. When the negative electrode protrusion 122c of the all-solid-state battery has a rounded shape, it may refer that the negative electrode protrusion 122c (for example, 122c' in FIG. 5 or 122c" in FIGS. 6 and 7) observed from the XZ cross-section passing through a center of the all-solid-state battery has a rounded shape, and it may refer that, more specifically, a shape of the negative electrode protrusion 122c (for example, 122c' in FIG. 5 or 122c" in FIGS. 6 and 7) in a direction facing the positive electrode terminal is not angled, and slopes of tangent lines with respect to the cross-section of the negative electrode protrusion 122c continuously change.

In an embodiment of the present disclosure, a negative electrode ion concentration portion and a negative electrode electric field concentration portion of an all-solid-state battery may be disposed to be spaced apart from each other on the same negative electrode reference surface. Referring to FIGS. 4 to 7, the negative electrode ion concentration portion of the present disclosure may refer to an end of the insulator 141 (141' in FIG. 5 or 141" in FIGS. 6 and 7) in a direction facing the negative electrode layer 122, as described above, and may refer to an end of the insulator 141 (141' in FIG. 5 or 141" in FIGS. 6 and 7) in which the negative electrode active material and the negative electrode reference surface are in contact with each other. The negative electrode ion concentration portion may be a position in which ions of a solid electrolyte are concentrated during charging and discharging of the all-solid-state battery, and may become a point in which dendrite grows.

In addition, as described above, a negative electrode electric field concentration portion may be provided in a position in the third direction, corresponding to an end portion of the negative electrode current collector. In an all-solid-state battery according to the present disclosure, a negative electrode current collector and a positive electrode current collector may be arranged to oppose each other in parallel, but should be spaced apart from each other by a certain distance, to avoid a short circuit in a region adjacent to a negative electrode terminal and a positive electrode terminal.

In this case, since charging and discharging may be evenly performed in a region having a surface in which the negative electrode current collector and the positive electrode current collector oppose to be parallel to each other, a phenomenon in which an electric field is particularly concentrated may not be generated. Since opposite poles of the same area cannot be opposed to ends of the negative electrode current collector in a direction facing the positive electrode terminal and the ends of the positive electrode current collector in a direction facing the negative electrode terminal, a phenomenon in which an electric field is concentrated at the ends during charging and discharging may be generated. In the all-solid-state battery of this embodiment, the negative electrode ion concentration portion and the negative electrode electric field concentration portion may be arranged to be spaced apart from each other on the same negative electrode reference surface, such that ions and electric fields may not be concentrated in the same position, thereby effectively suppressing dendrite growth.

Figure 1:
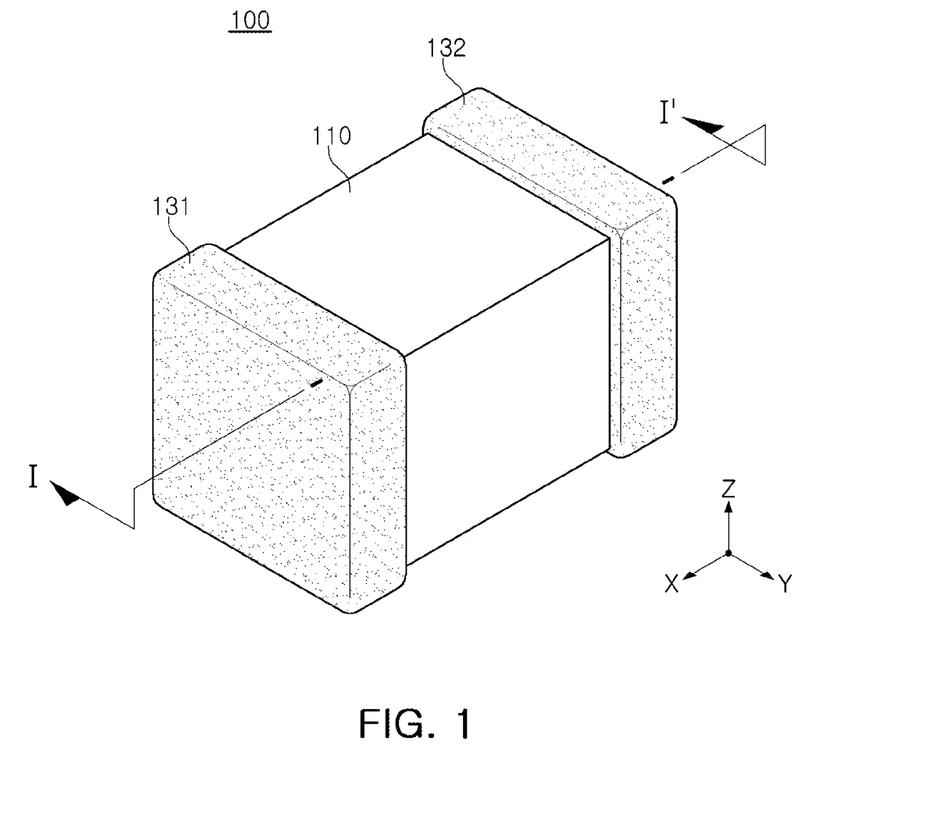
FIG. 1 is a perspective view schematically illustrating an all-solid-state battery according to an embodiment of the present disclosure.
Figure 2:
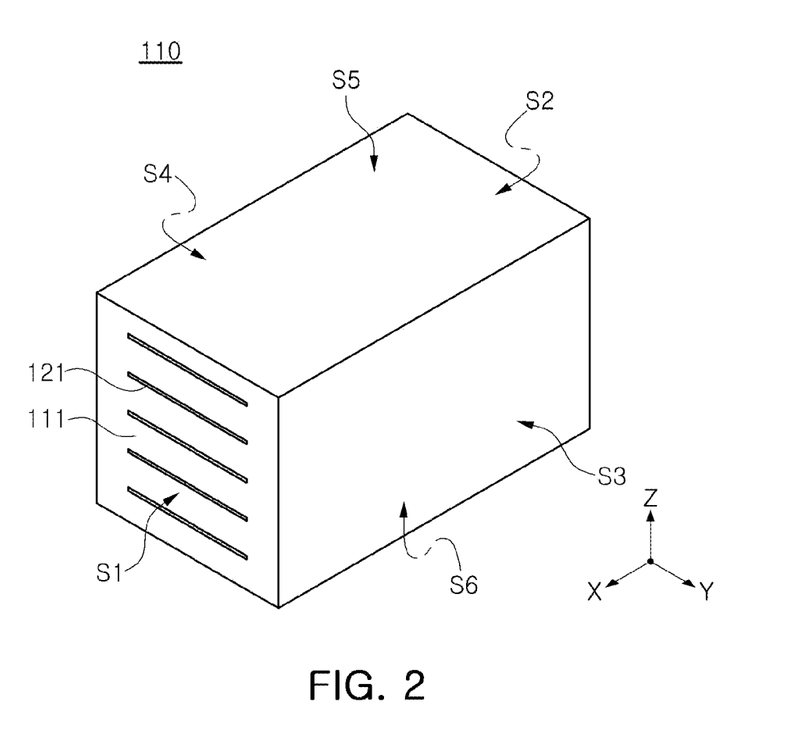
FIG. 2 is a perspective view schematically illustrating the electrode assembly of FIG. 1.
Figure 3:
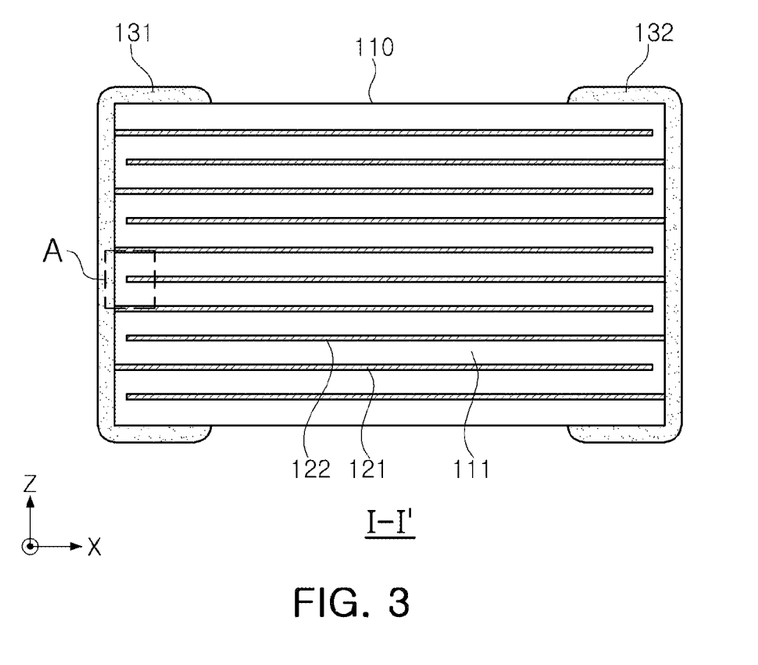
FIG. 3 is a cross-sectional view of FIG. 1, taken along line I-I'.
Figure 4:
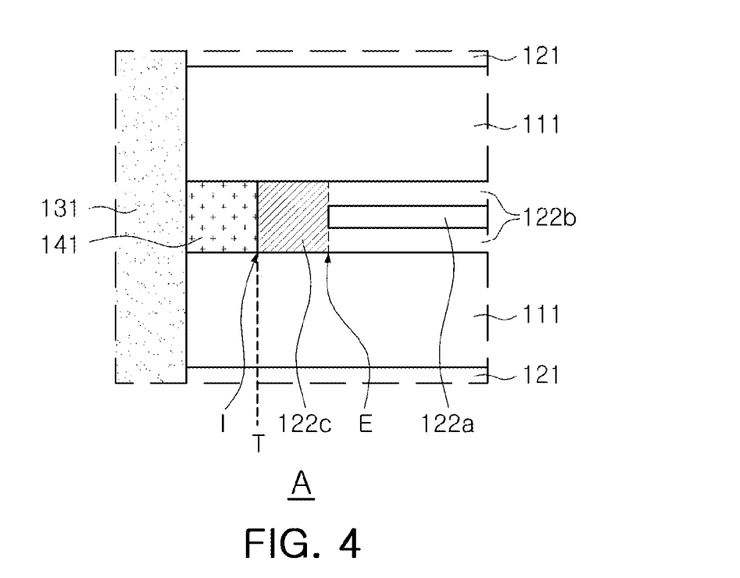
FIGS. 4 to 7 are enlarged views of portion A of FIG. 3, and are views illustrating various examples of an all-solid-state battery according to an embodiment of the present disclosure.
Figure 5:
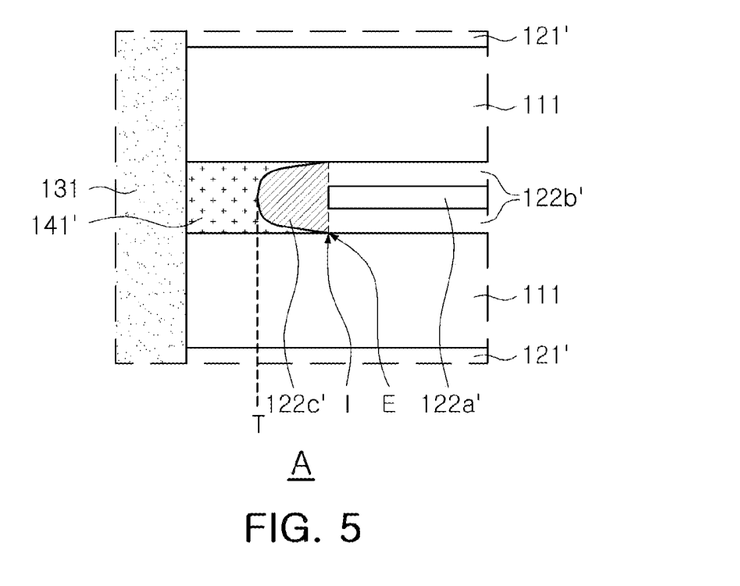
Figure 6:
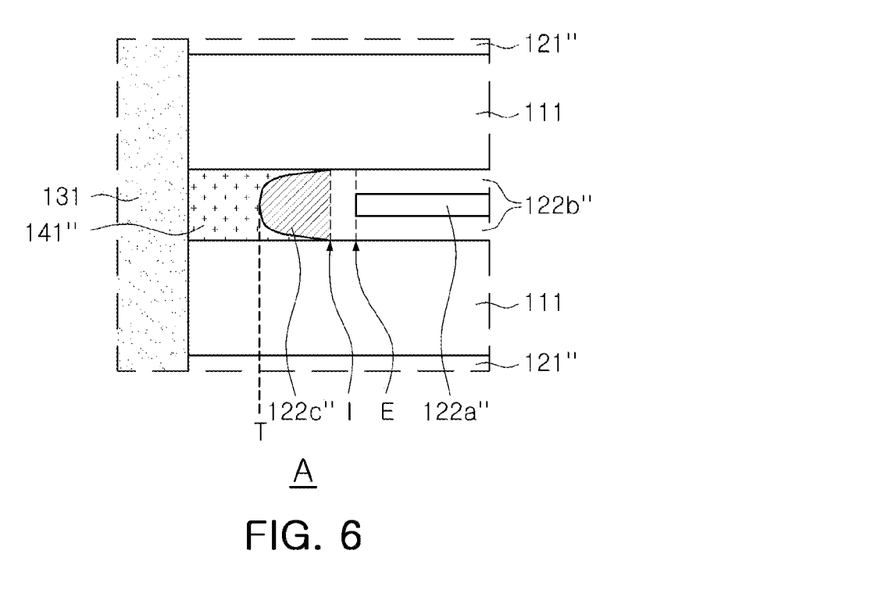

In an example, a distance between a negative electrode ion concentration portion I and a positive electrode terminal 131 of an all-solid-state battery may be less than a distance between a negative electrode electric field concentration portion E and the positive electrode terminal 131. Referring to FIG. 6, the negative electrode ion concentration portion I may be located relatively close to the positive electrode terminal 131. The negative electrode electric field concentration portion E may be disposed closer to a negative electrode terminal, as compared to the negative electrode ion concentration portion. In this case, an end of a negative electrode current collector 122a' in a direction facing the positive electrode terminal 131 may be disposed not to contact the negative electrode protrusion 122c'.

Figure 7:
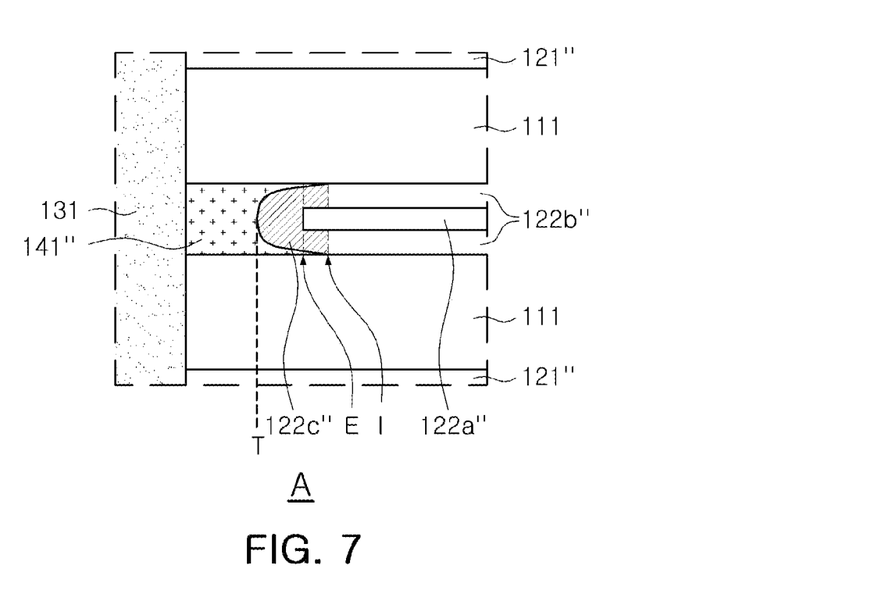

In another example, a distance between a negative electrode ion concentration portion I and a positive electrode terminal 131 of an all-solid-state battery may be greater than a distance between a negative electrode electric field concentration portion E and the positive electrode terminal 131. Referring to FIG. 7, the negative electrode ion concentration portion I may be located relatively close to a negative electrode terminal. The negative electrode electric field concentration portion E may be disposed closer to the positive electrode terminal 131, as compared to the negative electrode ion concentration portion I. In this case, an end of the negative electrode current collector 122a'' in a direction facing the positive electrode terminal may be disposed to be located inside the negative electrode protrusion 122c''.

A positive electrode of an all-solid-state battery according to the present disclosure may include a positive electrode current collector and a positive electrode active material.

In an example of the present disclosure, the positive electrode active material included in the positive electrode is not particularly limited as long as it may secure sufficient capacity. For example, the positive electrode active material may include one or more selected from the group consisting of lithium cobalt oxide, lithium nickel cobalt manganese oxide, lithium nickel cobalt aluminum oxide, lithium iron phosphate, and lithium manganese oxide, but is not limited thereto. All positive electrode active materials available in the related art may be used.

The positive electrode active material may be, for example, a compound represented by the following formula: $Li_aA_{1-b}M_bD_2$ (where $0.90 \leq a \leq 1.8$, $0 \leq b \leq 0.5$); $Li_aE_{1-b}MbO_{2-c}D_c$ (where $0.90 \leq a \leq 1.8$, $0 \leq b \leq 0.5$, $0 \leq c \leq 0.05$); $LiE_{2-b}M_bO_{4-c}D_c$ (where $0 \leq b \leq 0.5$, $0 \leq c \leq 0.05$); $Li_aNi_{1-b-c}Co_bM_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bM_cO_{2-\alpha}X_\alpha$ (where $0.90 \leq a \leq 1.8$, $0 \leq b \leq 0.5$, $0 \leq c \leq 0.05$, $0 < \alpha < 2$); $Li_aNi_{1-b-c}CO_bM_cO_{2-\alpha}X_2$ (where $0.90 \leq a \leq 1.8$, $0 \leq b \leq 0.5$, $0 \leq c \leq 0.05$, $0 < \alpha < 2$); $Li_aNi_{1-b-c}Mn_bM_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bM_cO_{2-\alpha}X_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bM_cO_{2-\alpha}X_2$ (where $0.90 \leq a \leq 1.8$, $0 \leq b \leq 0.5$, $0 \leq c \leq 0.05$, $0 < \alpha < 2$); $Li_aNi_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_2$; $LiRO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the above formula, A may be Ni, Co, or Mn; M may be Al, Ni, Co, Mn, Cr, Fe, Mg, Sr, V, or a rare-earth element; D may be O, F, S, or P; E may be Co or Mn; X may be F, S, or P; G may be Al, Cr, Mn, Fe, Mg, La, Ce, Sr, or V; Q may be Ti, Mo or Mn; R may be Cr, V, Fe, Sc, or Y; J may be V, Cr, Mn, Co, Ni, or Cu.

The positive electrode active material may also be $LiCoO_2$, $LiMn_xO_{2x}$ (where $x=1$ or 2), $LiNi_{1-x}Mn_xO_{2x}$ (where $0 < x < 1$), $LiNi_{1-x-y}Co_xMn_yO_2$ (where $0 \leq x \leq 0.5$, $0 \leq y \leq 0.5$), $LiFePO_4$, $TiS_2$, $FeS_2$, $TiS_3$, or $FeS_3$, but is not limited thereto.

The positive electrode current collector of the all-solid-state battery according to the present disclosure may use the same configuration as the negative electrode current collector. As the positive electrode current collector, a porous body such as a mesh, mesh-like element, or the like may be used, and a porous metal plate such as stainless steel, nickel, copper, aluminum, or the like may be used, but is not limited thereto. In addition, the positive electrode current collector may be coated with an oxidation resistant metal or alloy film to prevent oxidation.

The positive electrode may be manufactured according to almost the same method, except that the positive electrode active material is used instead of the negative electrode active material in the above-described process of manufacturing the negative electrode.

In an example of the present disclosure, an all-solid-state battery according to the present disclosure may include an electrode assembly including first and second surfaces S1 and S2 opposed in a first direction (an X direction), third and fourth surfaces S3 and S4 opposed in a second direction (a Y direction), and fifth and sixth surfaces S5 and S6 opposed in a third direction (a Z direction), and in which a solid electrolyte layer, a negative electrode layer 122, and a positive electrode layer 121 are alternately stacked in the third direction (the Z direction); a positive electrode terminal connected to the positive electrode layer 121; a negative electrode terminal connected to the negative electrode layer 122; and an insulator disposed to contact an end portion of the positive electrode layer 121 in the first direction (the X direction).

In this case, the positive electrode layer 121 may include a positive electrode current collector, a positive electrode active material, and a positive electrode protrusion from which the positive electrode active material extends to protrude toward the insulator. In addition, at least one of a positive electrode ion concentration portion and a positive electrode electric field concentration portion may be disposed to be spaced apart from a positive electrode longitudinal end portion disposed on the same positive electrode reference surface. The positive electrode reference surface refers to a virtual X-Y plane contacting the positive electrode active material in the third direction (the Z direction). The positive electrode ion concentration portion refers to an end of the insulator in a direction facing the positive electrode layer 121. The positive electrode electric field concentration portion refers to a region in which a virtual line in the third direction and the positive electrode reference surface are in contact with each other, wherein the virtual line is drawn to contact an end of the positive electrode current collector in a direction facing the positive electrode terminal. The positive electrode longitudinal end portion refers to a region in which a virtual line in the third direction (the Z direction) and the positive electrode reference surface are in contact with each other, wherein the virtual line is drawn to contact an end of the positive electrode protrusion in a direction facing the negative electrode terminal.

A positive electrode layer 121, a positive electrode current collector, a positive electrode active material, an insulator, a positive electrode protrusion, and the like of the present disclosure may be the same as inverted shapes of the above-described shapes of FIGS. 4 to 10 in a lateral direction, and thus will not be separately illustrated.

In an embodiment of the present disclosure, a positive electrode ion concentration portion and a positive electrode electric field concentration portion of an all-solid-state battery may be disposed to be spaced apart from each other on the same positive electrode reference surface. As described above, the positive electrode ion concentration portion of the present disclosure may refer to an end of the insulator in a direction facing the positive electrode layer 121, and refer to an end of the insulator in a direction facing the negative electrode terminal in which the positive electrode active material and the positive electrode reference surface are in contact with each other. The positive electrode ion concentration portion may be a position in which ions of a solid electrolyte are concentrated during charging and discharging of the all-solid-state battery, and may become a point in which dendrite grows.

In addition, as described above, a positive electrode electric field concentration portion may be provided in a position in the third direction, corresponding to an end portion of the positive electrode current collector. In an all-solid-state battery of this embodiment, a positive electrode ion concentration portion and a positive electrode electric field concentration portion may be arranged to be spaced apart from each other on the same positive electrode reference surface, such that ions and electric fields may not be concentrated in the same position, thereby effectively suppressing dendrite growth.

In an example, a positive electrode layer 121 of an all-solid-state battery of the present disclosure may include a positive electrode protrusion. The positive electrode protrusion of the present disclosure may be a portion in which a positive electrode active material extends, and may be disposed to protrude toward the first direction. The positive electrode protrusion may be disposed such that the positive electrode active material protrudes toward an insulator, and may be disposed to protrude toward a negative electrode terminal. The positive electrode protrusion may function to prevent concentration of ions in a certain portion of the positive electrode active material and increase an area for charging/discharging.

In an example of the present disclosure, the positive electrode protrusion of the all-solid-state battery may have a tetragonal shape. When the positive electrode protrusion of the all-solid-state battery has a tetragonal shape, it may refer that the positive electrode protrusion observed in the XZ cross-section passing through a center of the all-solid-state battery has a tetragonal shape, and more specifically, a shape of the positive electrode protrusion in a direction facing the negative electrode terminal has a tetragonal shape. As long as it may be recognized as a tetragonal shape, various modifications such as an inclined shape or the like are possible.

In another example of the present disclosure, one end portion of the positive electrode protrusion of the all-solid-state battery may have a rounded shape. When the positive electrode protrusion of the all-solid-state battery has a rounded shape, it may refer that the positive electrode protrusion observed in the XZ cross-section passing through a center of the all-solid-state battery has a rounded shape, and it may refer that, more specifically, a shape of the protrusion in a direction facing the negative electrode terminal is not angled, and slopes of tangent lines with respect to the cross-section of the positive electrode protrusion continuously change.

In an example, a distance between a positive electrode ion concentration portion and a negative electrode terminal of an all-solid-state battery may be less than a distance between a positive electrode electric field concentration portion and the negative electrode terminal. The positive electrode electric field concentration portion may be disposed closer to the positive electrode terminal, as compared to the positive electrode ion concentration portion. In this case, an end of a positive electrode current collector in a direction facing the negative electrode terminal may be disposed not to contact the positive electrode protrusion.

In another example, a distance between a positive electrode ion concentration portion and a negative electrode terminal of an all-solid-state battery may be greater than a distance between a positive electrode electric field concentration portion and the negative electrode terminal. The positive electrode electric field concentration portion may be disposed in a position farther from a positive electrode terminal, as compared to the positive electrode ion concentration portion. In this case, an end of the positive electrode current collector in a direction facing the negative electrode terminal may be disposed to be located inside the positive electrode protrusion.

In another embodiment of the present disclosure, an all-solid-state battery according to the present disclosure may include an electrode assembly including first and second surfaces S1 and S2 opposed in a first direction, third and fourth surfaces S3 and S4 opposed in a second direction, and fifth and sixth surfaces S5 and S6 opposed in a third direction, and in which a solid electrolyte layer, a negative electrode layer 122, and a positive electrode layer 121 are alternately stacked in the third direction; a positive electrode terminal connected to the positive electrode layer 121; and a negative electrode terminal connected to the negative electrode layer 122. The positive electrode layer 121 includes a positive electrode current collector, a positive electrode active material, and a positive electrode protrusion from which the positive electrode active material extends to protrude toward the negative electrode terminal, an end portion of the positive electrode protrusion in a direction facing the negative electrode terminal has a rounded shape, and at least one of a positive electrode ion concentration portion and a positive electrode electric field concentration portion is disposed to be spaced apart from a positive electrode longitudinal end portion disposed on the same positive electrode reference surface. The positive electrode reference surface refers to a virtual X-Y plane contacting the positive electrode active material in the third direction. The positive electrode ion concentration portion refers to a point of the positive electrode protrusion of which the rounded shape starts. The positive electrode electric field concentration portion refers to a region in which a virtual line in the third direction and the positive electrode reference surface are in contact with each other, wherein the virtual line is drawn to contact an end of the positive electrode current collector in a direction facing the negative electrode terminal. The positive electrode longitudinal end portion refers to a region in which a virtual line in the third direction and the positive electrode reference surface are in contact with each other, wherein the virtual line is drawn to contact an end of the positive electrode protrusion in a direction facing the negative electrode terminal.

In the above embodiment, the positive electrode ion concentration portion and the positive electrode electric field concentration portion of the all-solid-state battery may be disposed to be spaced apart from each other on the same positive electrode reference surface.

In the above embodiment, a distance between the positive electrode ion concentration portion and the negative electrode terminal of the all-solid-state battery may be less than a distance between the positive electrode electric field concentration portion and the negative electrode terminal.

In the above embodiment, a distance between the positive electrode ion concentration portion and the negative electrode terminal of the all-solid-state battery may be greater than a distance between the positive electrode electric field concentration portion and the negative electrode terminal.

Descriptions of the positive electrode ion concentration portion, the positive electrode electric field concentration portion, the positive electrode reference surface, the positive electrode terminal, the negative electrode terminal, and the like, may be the same as described above, and thus will be omitted.

A method of forming a negative electrode terminal and a positive electrode terminal of an all-solid-state battery according to the present disclosure is not particularly limited. The negative electrode terminal and the positive electrode terminal may be formed by applying a terminal electrode paste containing a conductive metal on a surface of an electrode assembly from which a negative electrode layer 122 and a positive electrode layer 121 are lead, and baking the same, but is not limited thereto. The conductive metal may be, for example, one or more conductive metals of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto.

In an example, an all-solid-state battery according to the present disclosure may further include plating layers respectively disposed on the negative electrode terminal and the positive electrode terminal. The plating layer may include one or more selected from the group consisting of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto. The plating layer may be formed as a single layer or a plurality of layers, and may be formed by sputtering or electroplating, but is not limited thereto.

One of various effects of the present disclosure is to suppress ion concentration in a negative electrode and/or a positive electrode of an all-solid-state battery.

One of various effects of the present disclosure is to suppress electric field concentration in a negative electrode and/or a positive electrode of an all-solid-state battery.

One of various effects of the present disclosure is to provide an all-solid-state battery capable of suppressing dendrite growth.

However, the various advantages and effects of the present disclosure are not limited to the above-described contents, and can be more easily understood in the course of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. An all-solid-state battery comprising:
    an electrode assembly including first and second surfaces opposed in a first direction, third and fourth surfaces opposed in a second direction, and fifth and sixth surfaces opposed in a third direction, and in which a solid electrolyte layer, a positive electrode layer, and a negative electrode layer are alternately stacked in the third direction;
    a negative electrode terminal connected to the negative electrode layer;
    a positive electrode terminal connected to the positive electrode layer; and
    an insulator disposed to contact an end portion of the negative electrode layer in the first direction and disposed between the positive electrode terminal and the negative electrode layer in the first direction,
    wherein the negative electrode layer comprises a negative electrode current collector, a negative electrode active material, and a negative electrode protrusion from which the negative electrode active material extends to protrude toward the insulator, and
    at least one of a negative electrode ion concentration portion and a negative electrode electric field concentration portion is disposed to be spaced apart from a negative electrode longitudinal end portion disposed on the same negative electrode reference surface,
    where, the negative electrode reference surface refers to a virtual first direction-second direction plane contacting the negative electrode active material in the third direction,
    the negative electrode ion concentration portion refers to an end of the insulator in a direction facing the negative electrode layer,
    the negative electrode electric field concentration portion refers to a region in which a virtual line in the third direction and the negative electrode reference surface are in contact with each other, wherein the virtual line is drawn to contact an end of the negative electrode current collector in a direction facing the positive electrode terminal, and
    the negative electrode longitudinal end portion refers to a region in which a virtual line in the third direction and the negative electrode reference surface are in contact with each other, wherein the virtual line is drawn to contact an end of the negative electrode protrusion in a direction facing the positive electrode terminal.

2. The all-solid-state battery of claim 1, wherein the negative electrode ion concentration portion and the negative electrode electric field concentration portion are arranged to be spaced apart from each other on the same negative electrode reference surface.

3. The all-solid-state battery of claim 2, wherein a distance between the negative electrode ion concentration portion and the positive electrode terminal is less than a distance between the negative electrode electric field concentration portion and the positive electrode terminal.

4. The all-solid-state battery of claim 2, wherein a distance between the negative electrode ion concentration portion and the positive electrode terminal is greater than a distance between the negative electrode electric field concentration portion and the positive electrode terminal.

5. The all-solid-state battery of claim 1, wherein one end portion of the negative electrode protrusion has a tetragonal shape.

6. The all-solid-state battery of claim 1, wherein one end portion of the negative electrode protrusion has a rounded shape.

7. An all-solid-state battery comprising:
an electrode assembly including first and second surfaces opposed in a first direction, third and fourth surfaces opposed in a second direction, and fifth and sixth surfaces opposed in a third direction, and in which a solid electrolyte layer, a positive electrode layer, and a negative electrode layer are alternately stacked in the third direction;
a negative electrode terminal connected to the negative electrode layer; and
a positive electrode terminal connected to the positive electrode layer,
wherein the negative electrode layer comprises a negative electrode current collector, a negative electrode active material, and a negative electrode protrusion from which the negative electrode active material extends to protrude toward the positive electrode terminal,
an end portion of the negative electrode protrusion in a direction facing the positive electrode terminal has a rounded shape, and
at least one of a negative electrode ion concentration portion and a negative electrode electric field concentration portion is disposed to be spaced apart from a negative electrode longitudinal end portion disposed on the same negative electrode reference surface,
where, the negative electrode reference surface refers to a virtual first direction-second direction plane contacting the negative electrode active material in the third direction,
the negative electrode ion concentration portion refers to a point of the negative electrode protrusion of which the rounded shape starts,
the negative electrode electric field concentration portion refers to a region in which a virtual line in the third direction and the negative electrode reference surface are in contact with each other, wherein the virtual line is drawn to contact an end of the negative electrode current collector in a direction facing the positive electrode terminal, and
the negative electrode longitudinal end portion refers to a region in which a virtual line in the third direction and the negative electrode reference surface are in contact with each other, wherein the virtual line is drawn to contact an end of the negative electrode protrusion in a direction facing the positive electrode terminal.

8. The all-solid-state battery of claim 7, wherein the negative electrode ion concentration portion and the negative electrode electric field concentration portion are arranged to be spaced apart from each other on the same negative electrode reference surface.

9. The all-solid-state battery of claim 8, wherein a distance between the negative electrode ion concentration portion and the positive electrode terminal is less than a distance between the negative electrode electric field concentration portion and the positive electrode terminal.

10. The all-solid-state battery of claim 8, wherein a distance between the negative electrode ion concentration portion and the positive electrode terminal is greater than a distance between the negative electrode electric field concentration portion and the positive electrode terminal.

11. An all-solid-state battery comprising:
an electrode assembly including first and second surfaces opposed in a first direction, third and fourth surfaces opposed in a second direction, and fifth and sixth surfaces opposed in a third direction, and in which a solid electrolyte layer, a negative electrolyte layer, and a positive electrode layer are alternately stacked in the third direction;
a positive electrode terminal connected to the positive electrode layer;
a negative electrode terminal connection to the negative electrode layer; and
an insulator disposed to contact an end portion of the positive electrode layer in the first direction and disposed between the negative electrode terminal and the positive electrode layer in the first direction,
wherein the positive electrode layer comprises a positive electrode current collector, a positive electrode active material, and a positive electrode protrusion from which the positive electrode active material extends to protrude toward the insulator, and
at least one of a positive electrode ion concentration portion and a positive electrode electric field concentration portion is disposed to be spaced apart from a positive electrode longitudinal end portion disposed on the same positive electrode reference surface,
where, the positive electrode reference surface refers to a virtual first direction-second direction plane contacting the positive electrode active material in the third direction,
the positive electrode ion concentration portion refers to an end of the insulator in a direction facing the negative electrode layer,
the positive electrode electric field concentration portion refers to a region in which a virtual line in the third direction and the positive electrode reference surface are in contact with each other, wherein the virtual line is drawn to contact an end of the positive electrode current collector in a direction facing the insulator, and
the positive electrode longitudinal end portion refers to a region in which a virtual line in the third direction and the positive electrode reference surface are in contact with each other, wherein the virtual line is drawn to contact an end of the positive electrode protrusion in a direction facing the negative electrode terminal.

12. The all-solid-state battery of claim 11, wherein one end portion of the positive electrode protrusion has a rounded shape.

13. The all-solid-state battery of claim 11, wherein the positive electrode ion concentration portion and the positive electrode electric field concentration portion are arranged to be spaced apart from each other on the same positive electrode reference surface.

14. The all-solid-state battery of claim 13, wherein a distance between the positive electrode ion concentration portion and the negative electrode terminal is less than a distance between the positive electrode electric field concentration portion and the negative electrode terminal.

15. The all-solid-state battery of claim 13, wherein a distance between the positive electrode ion concentration portion and the negative electrode terminal is greater than a distance between the positive electrode electric field concentration portion and the negative electrode terminal.

16. An all-solid-state battery comprising:
an electrode assembly including first and second surfaces opposed in a first direction, third and fourth surfaces opposed in a second direction, and fifth and sixth surfaces opposed in a third direction, and in which a solid electrolyte layer, a negative electrode layer, and a positive electrode layer are alternately stacked in the third direction;
a positive electrode terminal connection to the positive electrode layer; and
a negative electrode terminal connected to the negative electrode layer,
wherein the positive electrode layer comprises a positive electrode current collector, a positive electrode active material, and a positive electrode protrusion from which the positive electrode active material extends to protrude toward the negative electrode terminal,
an end portion of the positive electrode protrusion in a direction facing the negative electrode terminal has a rounded shape, and
at least one of a positive electrode ion concentration portion and a positive electrode electric field concentration portion is disposed to be spaced apart from a positive electrode longitudinal end portion disposed on the same positive electrode reference surface,
where, the positive electrode reference surface refers to a virtual first direction-second direction plane contacting the positive electrode active material in the third direction,
the positive electrode ion concentration portion refers to a point of the positive electrode protrusion at which the rounded shape starts,
the positive electrode electric field concentration portion refers to a region in which a virtual line in the third direction and the positive electrode reference surface are in contact with each other, wherein the virtual line is drawn to contact an end of the positive electrode current collector in a direction facing the negative electrode terminal, and
the positive electrode longitudinal end portion refers to a region in which a virtual line in the third direction and the positive electrode reference surface are in contact with each other, wherein the virtual line is drawn to contact an end of the positive electrode protrusion in a direction facing the negative electrode terminal.

17. The all-solid-state battery of claim 16, wherein the positive electrode ion concentration portion and the positive electrode electric field concentration portion are arranged to be spaced apart from each other on the same positive electrode reference surface.

18. The all-solid-state battery of claim 17, wherein a distance between the positive electrode ion concentration portion and the negative electrode terminal is less than a distance between the positive electrode electric field concentration portion and the negative electric terminal.

19. The all-solid-state battery of claim 17, wherein a distance between the positive electrode ion concentration portion and the negative electrode terminal is greater than a distance between the positive electrode electric field concentration portion and the negative electrode terminal.

20. An all-solid-state battery comprising:
an electrode assembly including a solid electrolyte layer, a positive electrode layer, and a negative electrode layer alternately stacked, the negative electrode layer having a first end portion and a second end portion opposing each other and the positive electrode layer having a third end portion and a fourth end portion opposing each other;
a negative electrode terminal connected to the first end portion of the negative electrode layer; and
a positive electrode terminal connected to the third end portion of the positive electrode layer,
wherein each of the positive electrode layer and the negative electrode layer comprises an electrode active material and an electrode current collector embedded in the electrode active material,
an insulator contacts the second end portion of the negative electrode layer to be disposed between the electrode active material of the negative electrode layer and the positive electrode terminal, or contacts the fourth end portion of the positive electrode layer to be disposed between the electrode active material of the positive electrode layer and the negative electrode terminal,
at the second end portion of the negative electrode layer or the fourth end of the positive electrode layer, one of the positive electrode layer and the negative electrode layer further comprises an electrode protrusion from which the electrode active material of the one of the positive electrode layer and the negative electrode layer extends to protrude toward the insulator, and
the electrode current collector is spaced apart from the insulator.

21. The all-solid-state battery of claim 20, wherein one end portion of the electrode active material of the one of the positive electrode layer and the negative electrode layer extending to protrude toward the insulator has a tetragonal shape.

22. The all-solid-state battery of claim 20, wherein one end portion of the electrode active material of the one of the positive electrode layer and the negative electrode layer extending to protrude toward the insulator has a rounded shape.

23. The all-solid-state battery of claim 20, wherein insulator includes a ceramic material.

* * * * *